H. G. J. BARRINGTON.
EDUCATIONAL APPLIANCE.
APPLICATION FILED MAY 29, 1916.

1,206,795.

Patented Dec. 5, 1916.

Fig.1.

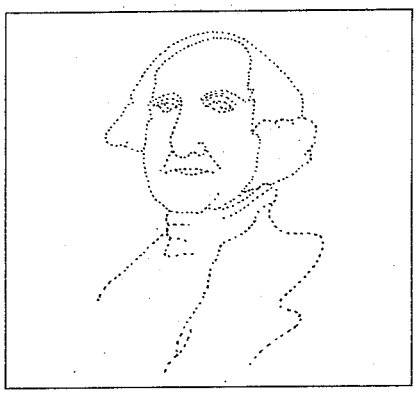

GEORGE WASHINGTON - First in War, First in Peace, First in the hearts of his Countrymen. Born in Virginia 1732. Died 1799. Served from 1789 to 1797.

Fig.2.

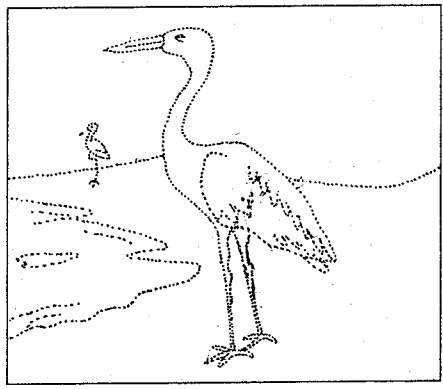

HERON - A Wading Bird. There are Purple, Blue, White and Green Herons.

Fig.3.

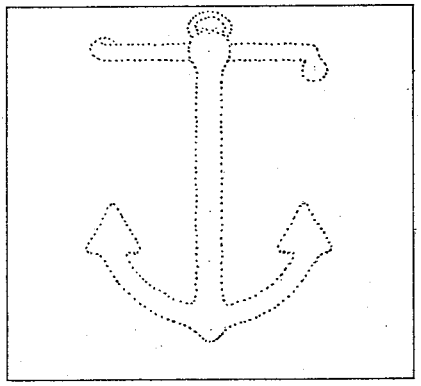

ANCHOR - For fastening a Vessel to keep it from drifting away.

Fig.4.

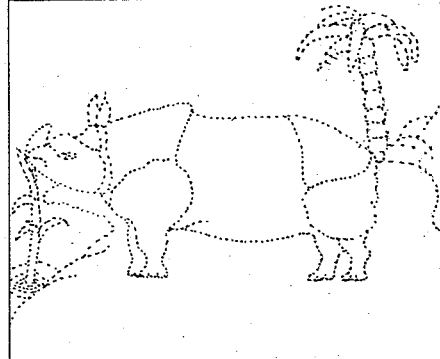

RHINOCEROS - Found in Africa and India. Has a very tough hide.

Inventor
Horace G. J. Barrington
by
Attorney

UNITED STATES PATENT OFFICE.

HORACE G. J. BARRINGTON, OF NEW YORK, N. Y.

EDUCATIONAL APPLIANCE.

1,206,795.   Specification of Letters Patent.   Patented Dec. 5, 1916.

Application filed May 29, 1916. Serial No. 100,608.

*To all whom it may concern:*

Be it known that I, HORACE G. J. BARRINGTON, a citizen of the United States, residing at New York, in the county of New York and State of New York, have invented a certain new and useful Improvement in Educational Appliances, of which the following is a full, clear, and exact description.

The object of this invention is to provide means by which to guide and assist a learner in obtaining a knowledge of drawing and of the object represented in and by the drawing.

The object of the invention is attainable by the use of a single representation, with accompanying descriptive text, and is also capable of being expressed in a series of pictures of related subjects or objects, such for instance, as the Presidents of the United States, a series of birds, a series of mechanical devices, a series of animals, maps, charts, etc. The invention, as will appear later on, is capable of indefinite extension so far as its adaptability is concerned.

The invention consists in incompletely representing pictorially or graphically any object or subject in such way that in order to obtain a finished representation, the learner must complete the delineation, the incomplete lines used in the original picture being followed and more or less completely covered up by the learner in finishing the representation.

A further element of the invention comprises the addition of descriptive matter or text to the various representations.

In carrying out the invention, as already intimated, there may be a single object, with the accompanying text, or a series of related objects, with the accompanying text, and these may be arranged in sheet or leaf form.

Of course, I am aware that learners have been taught drawing by the use of incomplete figures, or by more or less complete figures in outline, and otherwise, with an adjacent blank on which the printed figure is to be copied, but while this may answer for more or less apt or advanced pupils, the present invention is designed particularly to stimulate the hand and mind of the young.

In the accompanying drawings illustrating the invention, in the several figures of which like parts are similarly designated, Figure 1 is a view illustrating the invention as applied to a picture of a President of the United States. Fig. 2 is a view illustrating the invention as applied to a picture of a bird. Fig. 3 is a view illustrating the invention as applied to a picture of a mechanical object. Fig. 4 is a view illustrating the invention as applied to a picture of a quadruped.

As already sufficiently indicated, each page may be complete in itself with one picture, or any number of pictures may be placed on a page, and these pictures may be of related or unrelated subjects or objects.

As shown in Fig. 1, a representation of President George Washington is shown in dotted outline, and beneath the picture is a short text designed particularly for the information of beginners. Fig. 2 shows a heron in dotted outline, with a meager landscape, and beneath the picture also is an appropriate short description. In Fig. 3 an anchor is shown in dotted outline, and beneath it is a short description. In Fig. 4 a rhinoceros is shown in dotted outline, and also a portion of its habitat, and beneath the picture is a short descriptive paragraph.

It is to be understood that the dotted or faint lines are to be followed by the learner with pencil or pen or brush, and these lines converted into continuous or bold lines, so as to get the outline of the picture in full finish lines, and thus complete the picture. Of course, any additional matter may be placed upon the picture, such as shading or colors. If colors are intended to be used, it will be found convenient to add to the picture or adjacent to the picture a printed color key, and mark the picture in accordance with the color key.

The outline may be printed with a very light impression, and in an easily obscured or obliterated color, so that when the picture is finished by the learner the dotted lines will not appear. By dotted lines, of course, I mean to include not only lines made up of a series of dots, but also lines made up discontinuously or broken in any well known or possible way. Furthermore, the outline may be printed in light or faint full lines.

When a series of pictures occupy a single sheet or page, each picture may be divided off by suitable inclosing lines or border lines.

Thus it will be seen that by pictorially representing objects or subjects in dotted or faint lines, in conjunction with descriptive matter or text, it is possible to provide an interesting and fascinating means for young and old alike in developing pictures on a great variety of subjects, and at the same time teaching drawing, and meanwhile impressing upon the learner, by means of the reading matter or descriptive text, the facts concerning the pictures in the making, and also affording amusement and entertainment to the person. The scheme involves in a very practical way, self-instruction.
What I claim is:—

1. An educational appliance, comprising a sheet having an outline representation of an object or subject done in incomplete lines and adapted to be fully developed in full lines by the learner following the incomplete lines, and appropriate reading matter arranged in convenient proximity to the representation and descriptive thereof and serving conjointly with the representation to aid in fixing in the learner's mind the facts thereby objectively presented.

2. An educational appliance for self-instruction, comprising a series of sheets containing pictorial representations of series of objects forming subjects of learning, said representations being delineated in incomplete lines, the pictures thus incompletely shown being adapted to be developed fully by the learner transforming the incomplete lines into full lines, each object accompanied by permanently juxtaposed reading matter descriptive thereof so that the learner's interest is quickened.

3. An educational appliance for self-instruction, comprising a series of sheets containing pictorial representations of a series of related or classified objects forming subjects of learning, said representations being delineated in incomplete lines and adapted to be fully developed in full lines by the learner following the incomplete lines with a suitable delineating instrument, each object having placed adjacent to it reading matter more or less completely defining it and designed to be mentally absorbed by the learner while engaged in fully developing the picture.

In testimony whereof I have hereunto set my hand this 29th day of May, A. D. 1916.

HORACE G. J. BARRINGTON.

Witnesses:
 Wm. H. Finckel,
 W. H. Finckel, Jr.

Copies of this patent may be obtained for five cents each, by addressing the "Commissioner of Patents, Washington, D. C."